July 30, 1929.   J B. GREEN   1,722,570
APPARATUS FOR TESTING AND OTHERWISE UTILIZING FILLER RODS
Filed Jan. 21. 1926   2 Sheets-Sheet 1
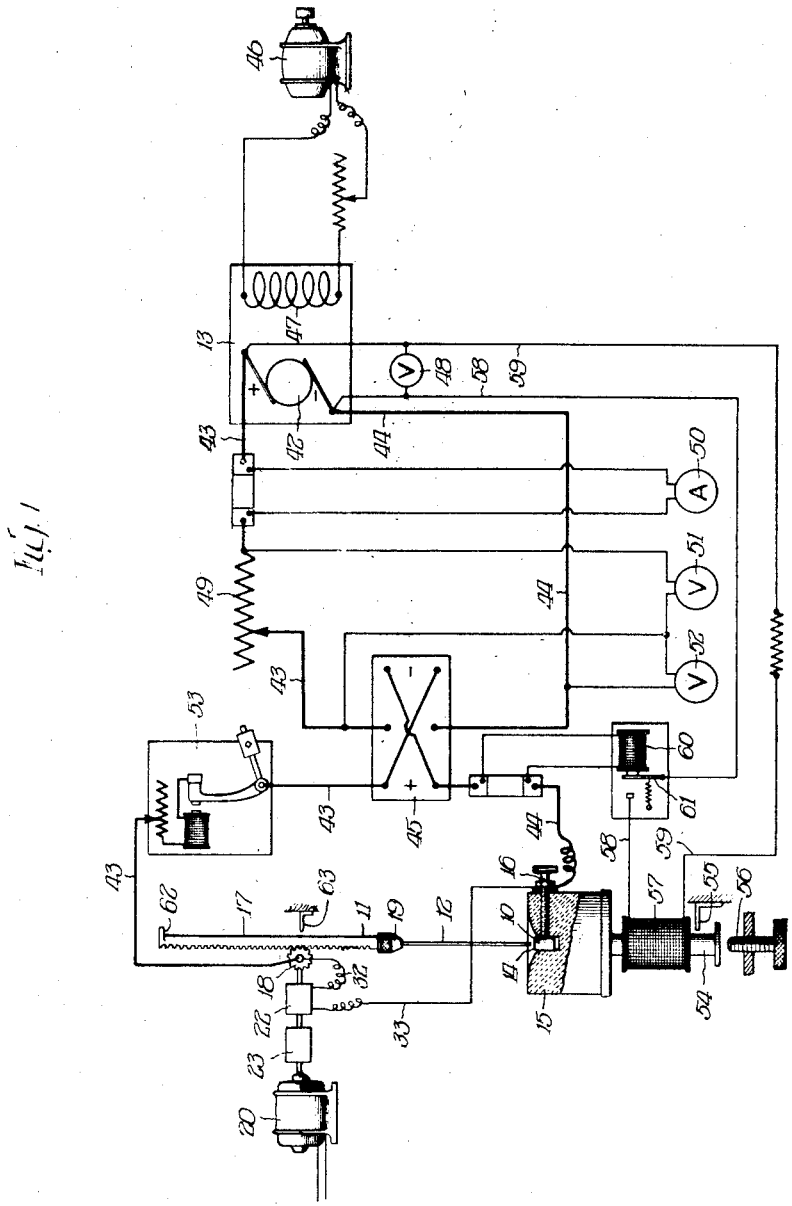

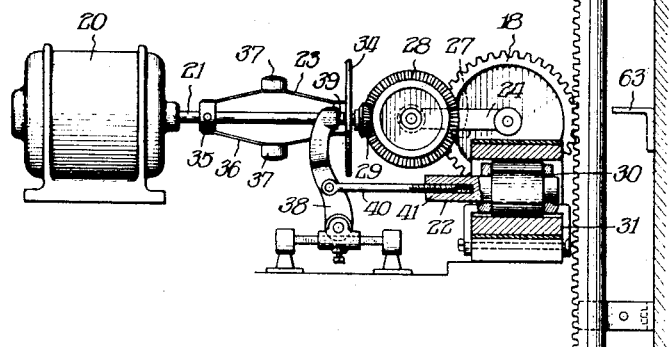
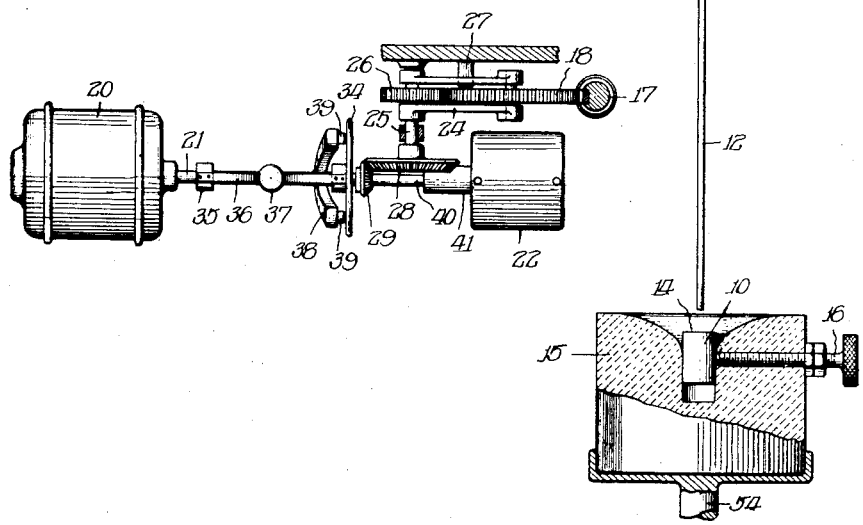

Patented July 30, 1929.

1,722,570

UNITED STATES PATENT OFFICE.

J BIRCHARD GREEN, OF CHICAGO, ILLINOIS.

APPARATUS FOR TESTING AND OTHERWISE UTILIZING FILLER RODS.

Application filed January 21, 1926. Serial No. 82,875.

The present invention represents what is believed to be the inception of a new art—that of scientifically testing metallic arc welding materials to determine the physical and chemical properties of the same under the influence of the arc. The apparatus of the present invention may also be applied generally to the utilization of the filler rods and other metallic arc welding materials.

The information which may be derived through such tests is of the greatest value, from a scientific standpoint as well as an industrial one, and is of far reaching application. It permits the scientist, for instance, to formulate the laws which govern the action of the arc; it makes it possible for the manufacturer to design welding rods correctly, and thereafter maintain standardized designs for the same; it enables the engineer to lay out structural steel and like fabrication elements to the best advantage, and specify with intelligence the materials and methods which are best suited for use in welding the same; it affords the purchaser opportunity to ascertain by conclusive tests whether he has received the quality and type of materials ordered; and it helps the welding operator to perform his work with improved technique. These are but a few of the more important benefits to be derived from the invention.

The purpose of the invention is to provide an apparatus by means of which metallic welding materials may be tested to arrive at heretofore unobtainable information concerning the fundamental laws governing the application of the electric arc and the physical as well as chemical properties of filler materials when under the influence of the arc.

The apparatus of the invention—which may be termed an "acrometer" since it is essentially concerned with measurements having to do with the arc—may assume any one of a great many different forms, all of which come equally within the contemplation of the invention and are covered by the appended claims. One of such forms is disclosed herein, in order that the invention may be readily understood.

In the accompanying drawings,

Fig. 1 is a schematic illustration of an apparatus embodying the invention;

Fig. 2 is a detail view of certain portions of the apparatus; and

Fig. 3 is a detail top view of the portion shown in Fig. 2.

The apparatus illustrated in the drawings includes a metallic stud 10, a holder 11 for supporting an electrode 12 in vertically spaced relation to the stud, and a supply of current 13 connected in circuit with the stud and electrode for producing an arc therebetween.

The stud 10 is provided with a welding zone 14 in the form of a flat circular surface about one inch in diameter, and is seated in a recess in a refractory hearth 15, being secured therein by a set screw 16 which also serves as a conductor for the current in passing to or from the stud.

When an arc is struck between the electrode and stud, the lower end of the electrode will be gradually consumed. Most of the material which leaves the electrode will drop in molten form onto the stud, some will pass off into the atmosphere as gas, and possibly a little will splatter onto the hearth about the stud. If no provision were made to maintain constant the distance between the melting end of the electrode and the welding zone of the stud, the length of the arc obviously would increase to a point where the arc would become extinguished owing to the prohibitive increase in the resistance of the gap. To prevent this, provision is made to advance the electrode toward the stud by rendering the holder 11 movable in that direction.

The holder 11 consists of an elongated rack 17 which meshes laterally with an operating pinion 18 and is provided at its lower end with a gripping chuck 19 for detachable association with the upper end of the electrode. The pinion 18 moves the holder, and is connected with a constant speed motor 20 by means of a shaft 21: the speed of movement of the holder in a direction toward the stud being determined by a control device 22 which acts upon a speed-governing device 23 on the shaft 21 and is influenced in its action by variations in the length of the arc. The pinion 18 in rotating permits the rack 17 to move downwardly, but the pinion and rack are also capable of being moved upwardly as a unit upon application of pressure to the electrode in that direction. The purpose of making provision for any upward or reverse movement of the electrode will appear hereinafter. To permit such movement, the pinion 18 is journalled in bearings at the end of a supporting bracket 24, and the bracket is hinged so that it may be swung about a countershaft 25 on which a pinion 26 is secured in mesh with the pinion 18. The bracket rests upon a stop 27 at all times except during upward movement of the electrode. The shaft 25 is rotated from a bevel pinion 28 which is in mesh with a smaller bevel pinion 29 on the shaft 21 of the motor 20.

The control device 22 is responsive to changes in the voltage across the arc, and may be a galvanometer arrangement which includes a rotatable armature 30, a suitable field for the armature energized by a coil 31, and leads 32 and 33 connecting the ends of the coil with the electrode and stud to effect a bypass through the coil for a portion of the current flowing across the arc. The armature is adapted to turn through a certain angle in one direction when the field is energized by the establishment of an arc of a certain voltage and is adapted to assume different positions when the arc voltage is increased or decreased by variations in the length of the arc. Any suitable means, such as a torsion spring, may be employed for returning the armature to its initial or zero position.

The speed-governing device 23, which acts under the control of the device 22, may be a centrifugal brake arrangement which includes a disk 34 slidably mounted on the shaft 21 of the motor 20, a sleeve 35 secured to the shaft and connected by leaf springs 36 with the disk, a plurality of centrifugally operated weights 37 secured to intermediate portions of the springs, and a pivoted yoke 38 which is adapted to act upon the disk through friction shoes 39 which press against one face of the disk at diametrically opposed points thereon. When the shaft 21 is rotated, the disk 34 tends to shift to the left thereon under the influence of the weights 37, and the position of the friction shoes 39 determines the speed at which the shaft may rotate by exerting a braking action against the disk. The yoke 38 is connected intermediate its ends to a rod 40 which is in helically threaded engagement with an extension 41 on the armature 30 of the control device, and the angular position of the armature therefore determines the position of the shoes 39. In this way the speed of the motor 20 may be controlled by the length of the arc between the electrode and stud, the speed at which the pinion 18 is driven to lower the electrode being increased when the arc length commences to exceed that which is desired, and being decreased when the arc length commences to lessen. The speed-governing device may be given any desired initial setting by shifting the pivoting point of the yoke 38 toward or away from the armature 30.

The supply of current 13 is of constant voltage, and is direct in character. It may be obtained from a suitable generator 42 and may be conducted to the electrode and stud by leads 43 and 44. A suitable switch 45 may be included in the circuit in order to permit of a reversal in the polarity of the electrode and stud. A separate exciting device 46 may be used in conjunction with the generator for the purpose of maintaining the voltage output thereof constant. A voltmeter 48 is connected up in such a way as to indicate the voltage of the generator. A manually variable ballast resistance 49 is placed in the circuit of the electrode and stud, and permits any desired apportioning of the generator voltage to the arc. An ammeter 50 is shunted with the lead 43, and indicates the amount of current flowing in the circuit. A voltmeter 51 is connected across the ballast resistance 49, and indicates the ballast voltage. Another voltmeter 52 is connected across what corresponds to the terminals of the circuit at the electrode and stud, and indicates the arc voltage. These three instruments are equipped with recording devices which will chart the current characteristics during the period of time taken for a run. An overload circuit breaker 53 is also included in the circuit, and is of an adjustable and self-setting type.

The hearth 15 is adapted to move vertically a sufficient distance to bring the stud seated therein into contact with the electrode, whereby to strike the arc, and is provided with means which will automatically cause such movement upon extinguishment of the arc and will allow the hearth and stud to drop again as soon as the arc is re-established. To accomplish such action, the hearth may be supported on the upper end of a rod 54 which is movable vertically and is limited in such movement by a stationary upper stop 55 and an adjustable lower stop 56. The rod 54 is moved by a solenoid 57, which solenoid is connected across the terminals of the generator 42 by leads 58 and 59. The circuit of the solenoid 57 is maintained open as long as the current is flowing across the arc by means of another solenoid 60 which acts upon a spring pressed switch arm 61 in the circuit of the solenoid 57 and prevents the arm from closing the circuit, the solenoid 60 being shunted with the lead 44 of the circuit of the electrode and stud and therefore energized by the current flowing therethrough.

The hearth 15 and the stud 10 are removably associated with the remainder of the apparatus and with each other, in order that they may be weighed before and after runs The apparatus is adapted to operate as follows:

The electrode 12 to be tested is inserted in the chuck 19, and the generator 42 started, the variable resistance associated therewith being adjusted to give the desired operating voltage, which will be shown on the meter 48. The variable resistance 49 is set to give the desired ballast voltage, which will be shown on meter 51. The rack 11 is lowered, by hand or otherwise, until the electrode 12 touches the stud 10, the hearth 15 meanwhile being held in an elevated position by the rod 54 owing to the energization of the solenoid 57 which occurred when the generator 42 commenced to supply current. The adjustable stop 56 for the rod 54 is set so that the distance between it and the cooperating portion of the rod equals the arc length desired. The motor 20 is started, and the control device 22 is set to maintain that arc length. The switch 45 is then thrown in the desired polarity, whereupon the solenoid 60 is actuated to break the circuit of the solenoid 57, causing the hearth and stud to drop to operating position, which separation of the electrode and stud strikes the arc. This condition immediately creates a change in the voltage across the arc, and influences the control device 22, which acts upon the speed-governing device 23, causing the rack 11 to move downwardly with the electrode.

The operation is automatic from this point on. If no freezes or breaks occur at the arc, the electrode continues to melt until a projection 62 on the rack engages with a stop 63, whereupon further downward movement of the rack is prevented and the arc extinguishes itself by consuming the electrode to maximum arc length, which length is greater than the distance which the solenoid 57 is permitted by the stop 55 to raise the stud 14 in attempting to reestablish the arc. If the arc breaks or the electrode freezes during the run, the arc current is discontinued, the circuit being opened either at the arc gap or at the overload circuit breaker 53. Such a stoppage of the current immediately actuates the solenoid 57, which brings the stud into and out of contact with the electrode to reestablish the arc, the electrode being permitted to recede upwardly a little upon such contact because of the special hinged mounting of the bearing bracket 24 which carries the operating pinion 18. As soon as contact is effected between the electrode and stud, the current will again flow through the circuit, and the solenoid 60 will break the circuit of the solenoid 57 and permit the stud 10 to drop, whereupon the arc will be reestablished. If the electrode freezes to the stud, the circuit-breaking device 53 will turn the arc current off and on as long as the current exceeds the maximum value for which the device is set, and, during that time the solenoid 57 will come into operation and reestablish the arc. The hearth and stud are elevated each time the main circuit is opened, and are dropped as soon as the circuit is again closed.

The apparatus above described includes certain automatically functioning devices which may be dispensed with in producing a more simple form of the invention. For example, the electrode might be fed toward the stud by manually operated means instead of by a power mechanism under automatic control, and the stud might be held in a fixed position instead of being movable toward and away from the electrode.

With the apparatus of the invention, electrodes of different materials may be tested under exactly the same conditions, and much valuable information derived which heretofore could not be obtained. The maximum arc length for any particular electrode consumed under predetermined conditions may be determined by placing a mark in the electrode even with the bottom of the chuck, then letting the electrode slip downwardly in the chuck until it bottoms in the crater formed on the stud and placing another mark on the electrode even with the bottom of the chuck. The distance between such marks will represent the maximum arc length. The disposition of the material of the electrode when consumed by the arc may be determined by comparison of the weights of the electrode, stud and hearth before and after the run, the difference in the aggregate weights of the parts before and after representing the amount of material volatilized. The length of time taken to consume any particular amount of the electrode is given by the recording charts on the several instruments, and the characteristics of the current producing the arc are also given by such charts.

I claim:

1. In an apparatus for testing and otherwise utilizing filler rods, a metallic stud, means for holding an electrode in opposition to this stud, a supply of current connected in circuit with the electrode and stud for producing an arc therebetween, and means for breaking the circuit upon shortage of the same.

2. In an apparatus for testing and otherwise utilizing filler rods, a metallic stud, means for holding an electrode in opposition to this stud, a supply of current connected in circuit with the electrode and stud for producing an arc therebetween, and means for reversing the direction in which the current flows across the arc.

3. In an apparatus for testing and otherwise utilizing filler rods, a metallic stud, means for holding an electrode in opposition to the stud, a supply of constant voltage current connected in circuit with the electrode and stud for producing an arc therebetween, and means for indicating the arc voltage.

4. In an apparatus for testing and otherwise utilizing filler rods, a metallic stud, means for holding an electrode in opposition to this stud, a supply of constant voltage current connected in circuit with the electrode and stud for producing an arc therebetween, and means for indicating the circuit amperage.

5. In an apparatus for testing and otherwise utilizing filler rods, a metallic stud, means for holding an electrode in opposition to this stud, a supply of constant voltage current connected in circuit with the electrode and stud for producing an arc therebetween, and means for indicating the supply voltage, the circuit amperage, the arc voltage and the ballast voltage.

6. In an apparatus for testing and otherwise utilizing filler rods, a metallic stud, means for holding an electrode in opposition to this stud, a supply of current connected in circuit with the electrode and stud for producing an arc therebetween, and means acting automatically upon continued shortage between the electrode and the stud to momentarily break and then re-establish the circuit.

In testimony whereof I have hereunto subscribed my name.

J BIRCHARD GREEN.